(12) United States Patent
Hirooka (10) Patent No.: US 9,004,532 B1
(45) Date of Patent: Apr. 14, 2015

(54) UTILITY VEHICLE WITH ROPS AND LOADING PLATFORM

(71) Applicant: Kubota Corporation, Osaka-shi (JP)

(72) Inventor: Yoshimi Hirooka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/197,468

(22) Filed: Mar. 5, 2014

(30) Foreign Application Priority Data

Sep. 26, 2013 (JP) ................................. 2013-200370

(51) Int. Cl.
*B60R 21/13* (2006.01)

(52) U.S. Cl.
CPC ..................... *B60R 21/13* (2013.01)

(58) Field of Classification Search
USPC .................... 280/756, 760; 180/330
See application file for complete search history.

(56) References Cited

U.S. PATENT DOCUMENTS

| 7,249,798 B2 * | 7/2007 | Saito et al. ..................... 296/205 |
| RE42,086 E * | 2/2011 | Saito et al. ..................... 296/205 |
| 8,550,500 B2 * | 10/2013 | Yamamoto et al. ........... 280/807 |
| 2010/0060026 A1 * | 3/2010 | Bowers ........................... 296/66 |
| 2011/0132678 A1 | 6/2011 | Nakamura et al. |
| 2012/0056411 A1 * | 3/2012 | Nakamura et al. ............ 280/756 |

FOREIGN PATENT DOCUMENTS

JP          2011116318 A    6/2011

* cited by examiner

*Primary Examiner* — Drew Brown
(74) *Attorney, Agent, or Firm* — The Webb Law Firm (57) ABSTRACT

A utility vehicle includes a front boarding section, a rear boarding section having a rear seat unit, a ROPS delimiting space including a front boarding space acting as a ride-in space of the front boarding section and a rear boarding space acting as a ride-in space of the rear boarding section, and a loading platform mounted rearward of the vehicle body. The ROPS includes a plurality of posts and an upper frame supported to the posts and delimiting upper space of the front boarding space and the rear boarding space. The loading platform is switchable between a first position in which a front end of the loading platform is positioned rearward of the rear boarding space and a second position in which the front end of the loading platform enters the rear boarding space.

7 Claims, 10 Drawing Sheets

UTILITY VEHICLE WITH ROPS AND LOADING PLATFORM

CROSS REFERENCE TO RELATED APPLICATION

This application claims priority to Japanese Patent Application No. 2013-200370 filed Sep. 26, 2013, the disclosure of which is hereby incorporated in its entirety by reference.

TECHNICAL FIELD OF THE INVENTION

The present invention relates to a utility vehicle including a ROPS (roll over protection structure) delimiting a front boarding space acting as a ride-in space of a front boarding section and a rear boarding space acting as a ride-in space of a rear boarding section, and a platform system. The platform system has a loading platform switchable between a first position in which a front end of the loading platform is positioned rearward of the rear boarding space and a second position in which the front end of the loading platform enters the rear boarding space.

RELATED ART OF THE INVENTION

An example of the utility vehicle of the above type is known from Japanese Unexamined Patent Application Publication No. 2011-116318 (U.S. Pat. No. 8,499,870). In such a utility vehicle, the rear boarding space can be used as a storing space for the loading platform thanks to the characteristic structure of the platform system described above. However, when the loading platform is moved to the second position, the front end of the loading platform enters the rear boarding space beyond rear posts forming the ROPS, and thus the rear posts disadvantageously obstruct access to the loading platform from a lateral side.

SUMMARY OF INVENTION

An object of the present invention is to secure easy access to the loading platform in any position in the utility vehicle of the above type.

A utility vehicle according to the present invention includes a vehicle frame extending in a fore-and-aft direction of a vehicle body, a front boarding section mounted forward of the vehicle body, a rear boarding section mounted rearward of the front boarding section and including a rear seat unit, a ROPS delimiting space including a front boarding space acting as a ride-in space of the front boarding section and a rear boarding space acting as a ride-in space of the rear boarding section, the ROPS including a plurality of posts supported to the vehicle frame and an upper frame supported to the posts and delimiting upper space of the front boarding space and the rear boarding space, and a platform system with a loading platform mounted rearward of the vehicle body to be switchable between a first position in which a front end of the loading platform is positioned rearward of the rear boarding space and a second position in which the front end of the loading platform enters the rear boarding space. The posts of the ROPS are arranged so as not to overlap the loading platform in both of the first position and the second position as viewed from a lateral side of the vehicle body.

With the above arrangement, since the posts of the ROPS do not overlap the loading platform as viewed from the side when the loading platform is shifted to either of the first position and the second position, easy access to the loading platform from the lateral side can be secured. In other words, loading and unloading operations relative to the loading platform can be conveniently performed from the lateral side, in whichever of the first position and the second position the loading platform is.

In a preferred embodiment of the present invention, the posts of the ROPS include a pair of right and left front posts and a pair of right and left rear posts, each of the front posts and the rear posts being spaced from each other in a transverse direction of the vehicle body, and the rear posts are positioned forward of the front end of the loading platform in the second position between the front boarding space and the rear boarding space in the fore-and-aft direction. Since the rear posts supporting the upper frame in cooperation with the front posts are also positioned forward of the rear boarding space in the fore-and-aft direction, the rear posts do not obstruct the access to the loading platform from the lateral side. More particularly, in the ROPS according to the present invention, the upper frame delimiting the upper space of the front boarding space and the rear boarding space is supported only by the posts positioned forward of the boarding space in the fore-and-aft direction of the vehicle body. This provides easy access to the rear boarding space from the lateral side of the vehicle body.

Further, in order to allow a passenger to get on and off the rear seat unit, in addition to providing easy access to the loading platform, the rear posts are positioned forward of the rear seat unit in a preferred embodiment of the present invention.

Additionally, in order to secure the strength for supporting the upper frame extending from the upper space of the front boarding space to the upper space of the rear boarding space, the rear posts are connected to the upper frame at intermediate portions of the upper frame in the fore-and-aft direction of the vehicle body. Further, in order to increase the strength for supporting the upper frame, the present invention further provides a pair of right and left reinforcement beams extending diagonally for connecting the rear posts to the upper frame at portions rearward of connecting points to the rear posts.

When the front end of the loading platform in the second position enters the rear boarding space with the rear seat unit being in the use position, it is required to increase the attaching level for the loading platform due to the presence of the rear seat unit. If the attaching level for the loading platform is reduced, the rear seat unit would hamper the loading platform from entering the rear boarding space and thus a sufficient length of the loading platform for entering the rear boarding space cannot be secured. Therefore, according to the present invention, the rear seat unit has a foldable structure to allow the rear seat unit to be switched between a use position in which the rear seat unit is developed in a rear region of the rear boarding space and a storing position in which the rear seat unit is folded in a front region of the rear boarding space, and the front end of the loading platform in the second position enters the open rear region of the rear boarding space created by shifting the rear seat unit to the storing position. With such an arrangement, since the front end of the loading platform in the second position enters the free space that is created by switching the rear seat unit to the storing position, it is not required to raise the loading platform to a higher level. Further, the sufficient length of the loading platform for entering the rear boarding space can be secured, as a result of which a large area forward and rearward of the rear boarding space can be used as a space for accommodating the loading platform.

DETAILED DESCRIPTION OF THE INVENTION

Embodiments of the present invention will be described hereinafter in reference to the accompanying drawings.

Figure 1:
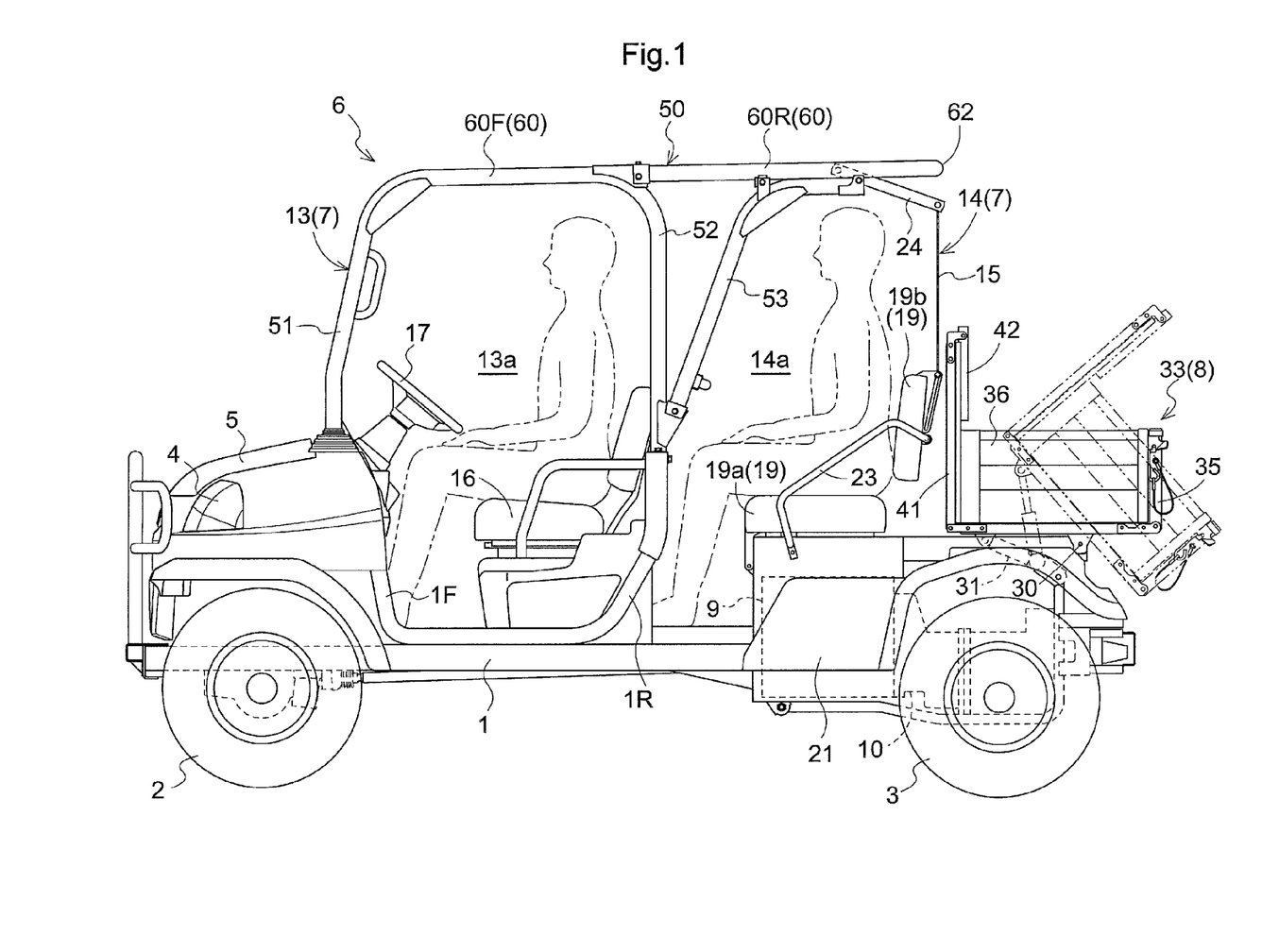
FIG. 1 is an overall side view of a utility vehicle with a loading platform shifted to a first position.
Figure 2:
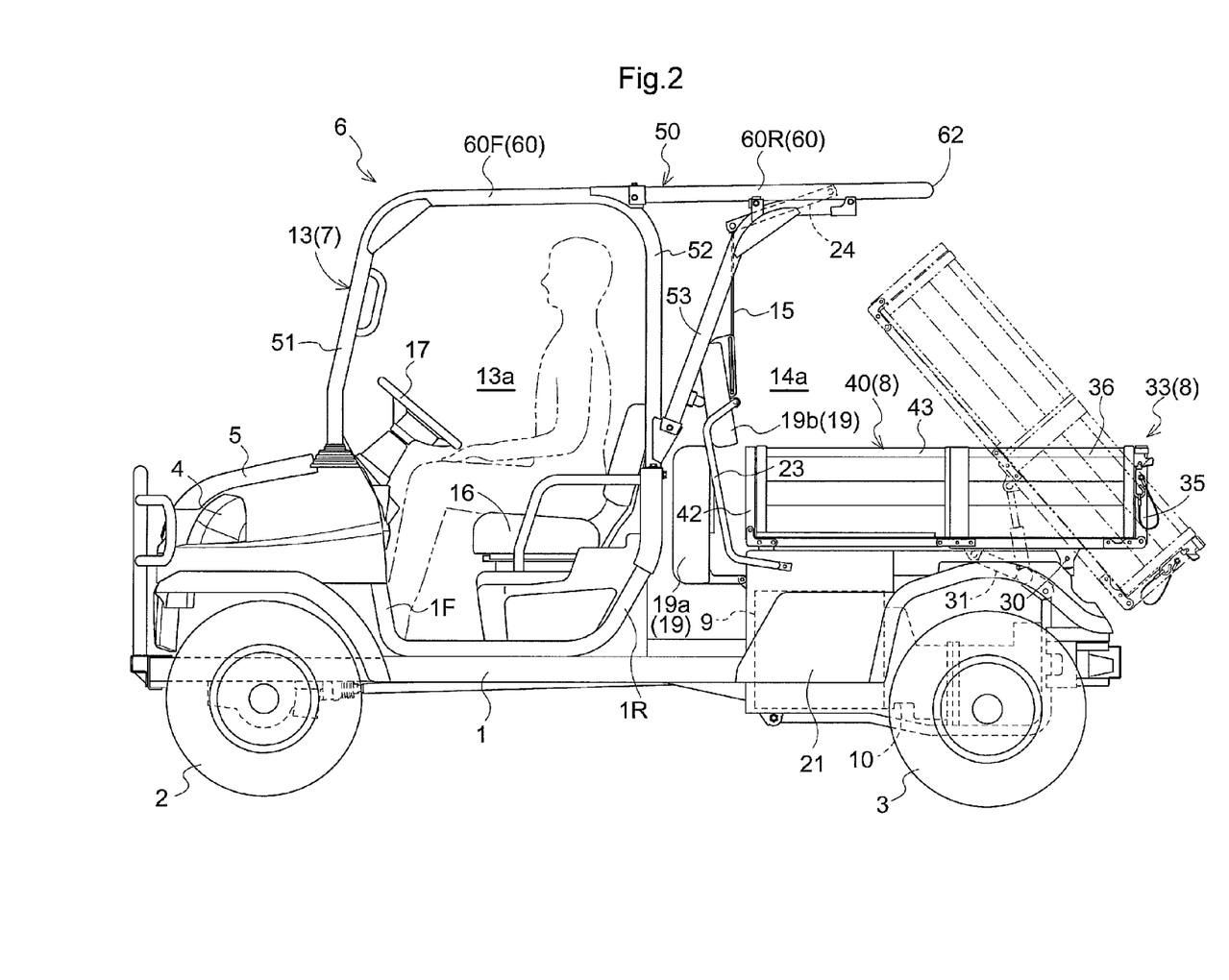
FIG. 2 is an overall side view of the utility vehicle with the loading platform shifted to a second position.
Figure 3:
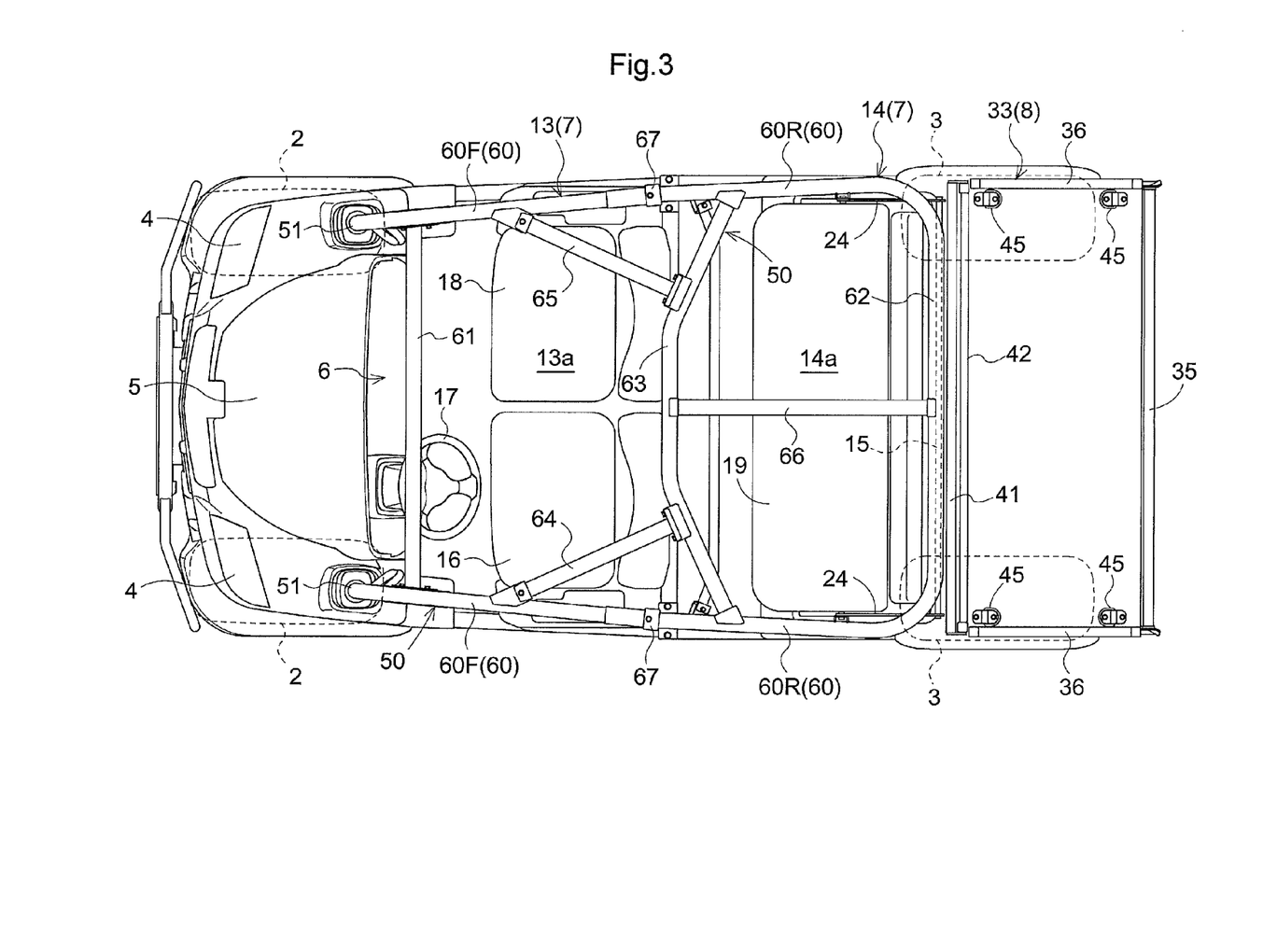
FIG. 3 is an overall plan view of the utility vehicle with the loading platform shifted to the first position.

Referring to FIGS. 1 to 3, a utility vehicle includes a vehicle body having a pair of right and left front wheels 2 and a pair of right and left rear wheels 3 provided under a vehicle frame 1, a front cover 5 with front lights 4 provided at a front end of the vehicle body, a boarding section 7 with a ROPS 6 mounted in the vehicle body at a portion rearward of the front cover 5, and a loading platform 8 mounted rearward of the vehicle body.

An engine 9 is mounted in the vehicle body between the front wheels 2 and the rear wheels 3. The utility vehicle in the current embodiment is a four-wheel drive type in which drive power outputted from the engine 9 is inputted to a transmission 10 and is shifted there to drive the front wheels 2 and the rear wheels 3.

Next, the boarding section 7 will be described hereinafter.

In addition to having the ROPS 6, the boarding section 7 is divided into a front boarding section 13 disposed forward of the boarding section 7, and a rear boarding section 14 disposed rearward of the front boarding section 13. The front boarding section 13 has a front boarding space 13a acting as a ride-in space, and the rear boarding section 14 has a rear boarding space 14a also acting as a ride-in space. An upper frame 50 of the ROPS 60 delimits upper space of the front boarding space 13a and the rear boarding space 14a. The front boarding space 13a and the rear boarding space 14a are separated from rear loading space by a partition 15.

A driver's seat unit 16 is mounted in a left area of the front boarding space 13a, and a steering wheel 17 is provided forward of the driver's seat unit 16 for steering the pair of right and left front wheels 2. Thus, the front boarding section 13 acts as the boarding section for a driver.

The front boarding section 13 includes a front passenger's seat unit 18 mounted in a right side of the front boarding space 13a for allowing two-person riding. The driver's seat unit 16 and the front passenger's seat unit 18 are separated from each other, in which seat and backrest for the driver's seat unit 16 are separated from seat and backrest for the front passenger's seat unit 18.

The rear boarding section 14 includes a rear seat unit 19. The rear seat unit 19 has a wide seat for two persons, and thus the rear boarding section 14 allows two-person riding.

Figure 4:
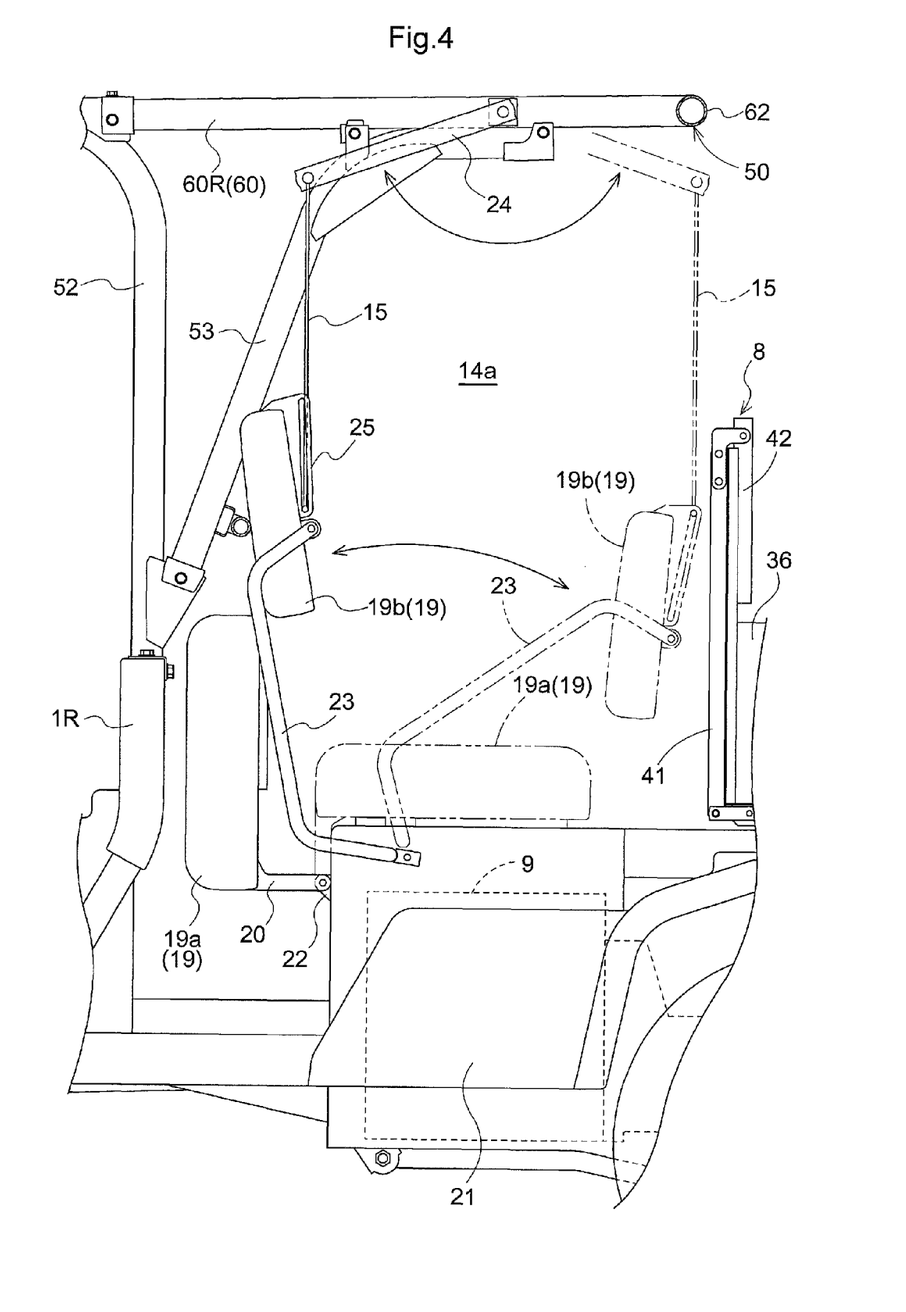
FIG. 4 is a side view of a rear seat unit and a partition.

The rear seat unit 19 is switchable between a use position shown in two-dot chain line and a storing position shown in solid line in FIG. 4. The rear seat unit 19 has a specific construction as follows.

The rear seat unit 19 includes a wide seat 19a and a wide backrest 19b.

The seat 19a is supported to a support element 22 of a rear seat support 21 through an attachment 20 mounted on a front end of the rear seat unit 19. The seat 19a is pivotable in a fore-and-aft direction about an axis of a connecting rod for connecting the attachment 20 to the support element 22. The seat 19a switchable by the pivotal movement in the fore-and-aft direction between the use position determined above the top of the rear seat support 21 and the storing position determined behind the driver's seat unit 16 and the front passenger's seat unit 18. The seat 19a is configured to open or close an inspection opening formed in the top of the rear seat support element 21 by switching between the use position and the storing position. The rear seat support 21 accommodates the engine 9 and also acts as an engine hood. That is, the seat 19a has a function as a lid for the inspection opening for inspection and maintenance for the interior of the rear seat support 21 and the engine 9.

Figure 5:
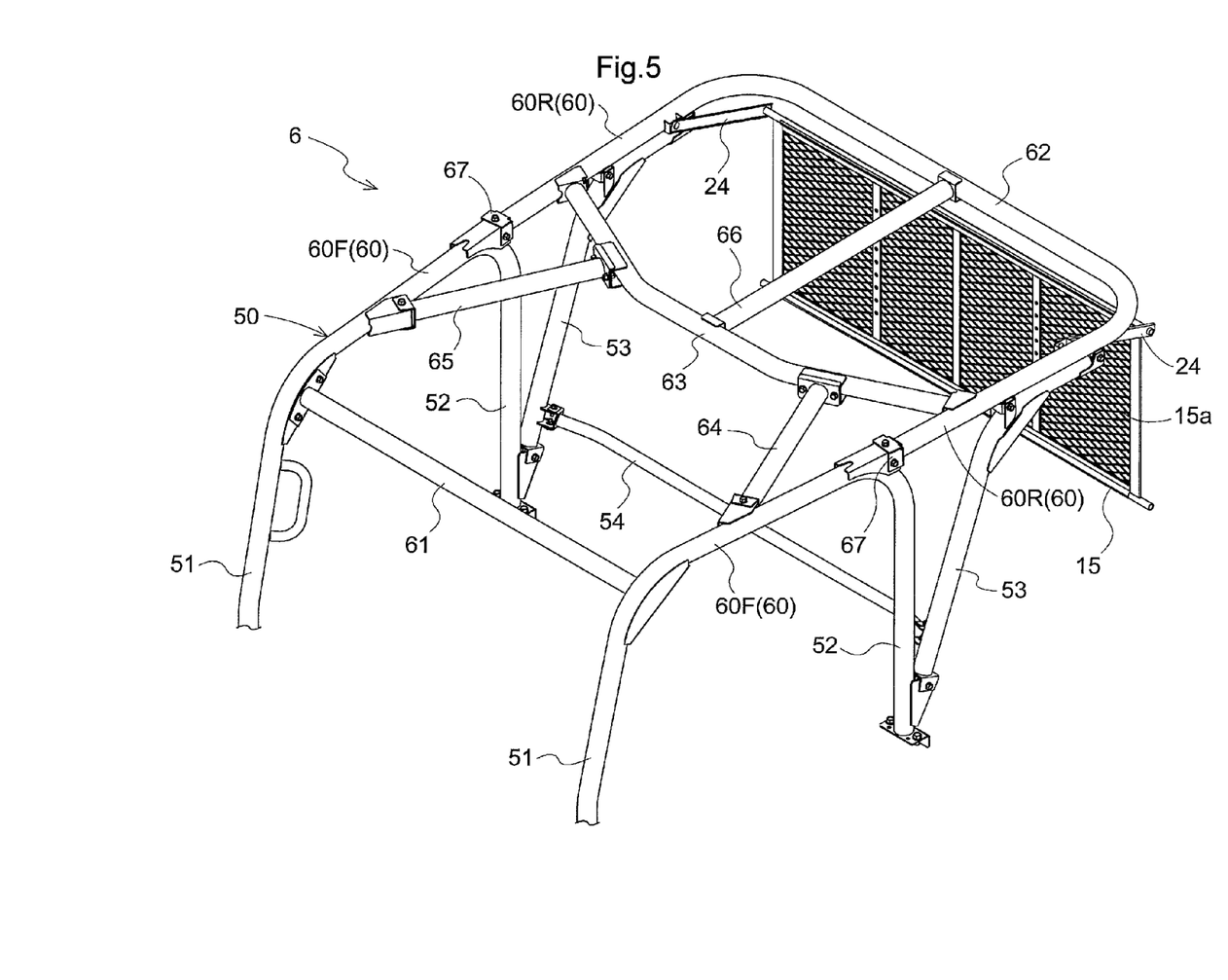
FIG. 5 is a perspective view of a ROPS.

The backrest 19b is connected to upper ends of a pair of right and left armrests 23 distributed in lateral opposite sides of the rear seat unit 19 and to a lower end of the partition 15. Each of the right and left armrests 23 has a lower end pivotably supported to the rear seat support 21. Each of the upper ends of the right and left armrests 23 is pivotably connected to a coupling element 25 mounted in the back side of the backrest 19b. The partition 15 has an upper end pivotably connected to extensions of a pair of right and left support arms 24 extending from the upper frame 50 of the ROPS 6 to be pivotable downward in the fore-and-aft direction, and a lower end connected to a connecting element 25 mounted in the back side of the backrest 19b. The lower end of the partition 15 is connected to a connecting slot formed in the connecting element 25 to slide and pivot. As shown in FIG. 5, the partition 15 has a partition frame formed of a cross element and a vertical element, and a net element 15a stretched in the partition frame.

More particularly, when the backrest 19b is moved in the fore-and-aft direction, the armrests 23 are pivoted in the fore-and-aft direction about connecting points acting as pivotal points between the armrests 23 and the rear seat support 21. Further, the partition 15 is moved in the fore-and-aft direction in the rear boarding space 14a with the support arms 24 being pivoted about connecting points acting as pivotal points between the support arms 24 and the upper frame 50. As a result, the backrest 19b is movable in the fore-and-aft direction between a use position above the use position of the seat 19a and a storing position above the storing position of the seat 19a.

Referring to FIGS. 1 and 4, the seat 19a and the backrest 19b are shifted to the respective use positions and firmly fixed in place by an unillustrated lock device, thereby to hold the rear seat unit 19 in a seating position defined in a rear part of the rear boarding space 14a to be used. When the rear seat unit 19 is moved to the position for use, the utility vehicle assumes a two-row seat arrangement in which both of the front boarding section 13 and the rear boarding section 14 are available. When the rear seat unit 19 is switched to the use position, the partition 15 can be moved to a rear partitioning position for the two-row seat arrangement defined in the rear end of the rear boarding section 14, that is, a rear partitioning position for dividing the rear boarding space 14a from the rear loading space.

Referring to FIGS. 2 and 4, the seat 19a and the backrest 19b are shifted to the respective storing positions and firmly fixed in place by an unillustrated lock device, thereby to hold the rear seat unit 19 in a part forward of the seating position of the rear boarding space 14a to be stored. When the rear seat unit 19 is moved to the storing position, the utility vehicle assumes a single-row seat arrangement in which only the front boarding section 13 is available. When the rear seat unit 19 is switched to the storing position, the partition 15 can be moved to a front partitioning position for the single-row seat arrangement defined in the forward part of the rear boarding space 14a, that is, a front partitioning position for dividing the front boarding space 13a from the rear loading space.

Next, a platform system will be described hereinafter.

Referring to FIG. 1, the loading platform 8 of the platform system is supported to the vehicle body to be vertically pivotable through a dump support axis 30 extending transversely of the vehicle body at the rear end of the vehicle body. The loading platform 8 is vertically operated between a loading position defined horizontally or substantially horizontally on the vehicle body, and a dumping position with a front end thereof being elevated from the vehicle body through a lift cylinder 31 disposed between a back surface of the loading platform 8 and the vehicle frame 1.

Figure 7:
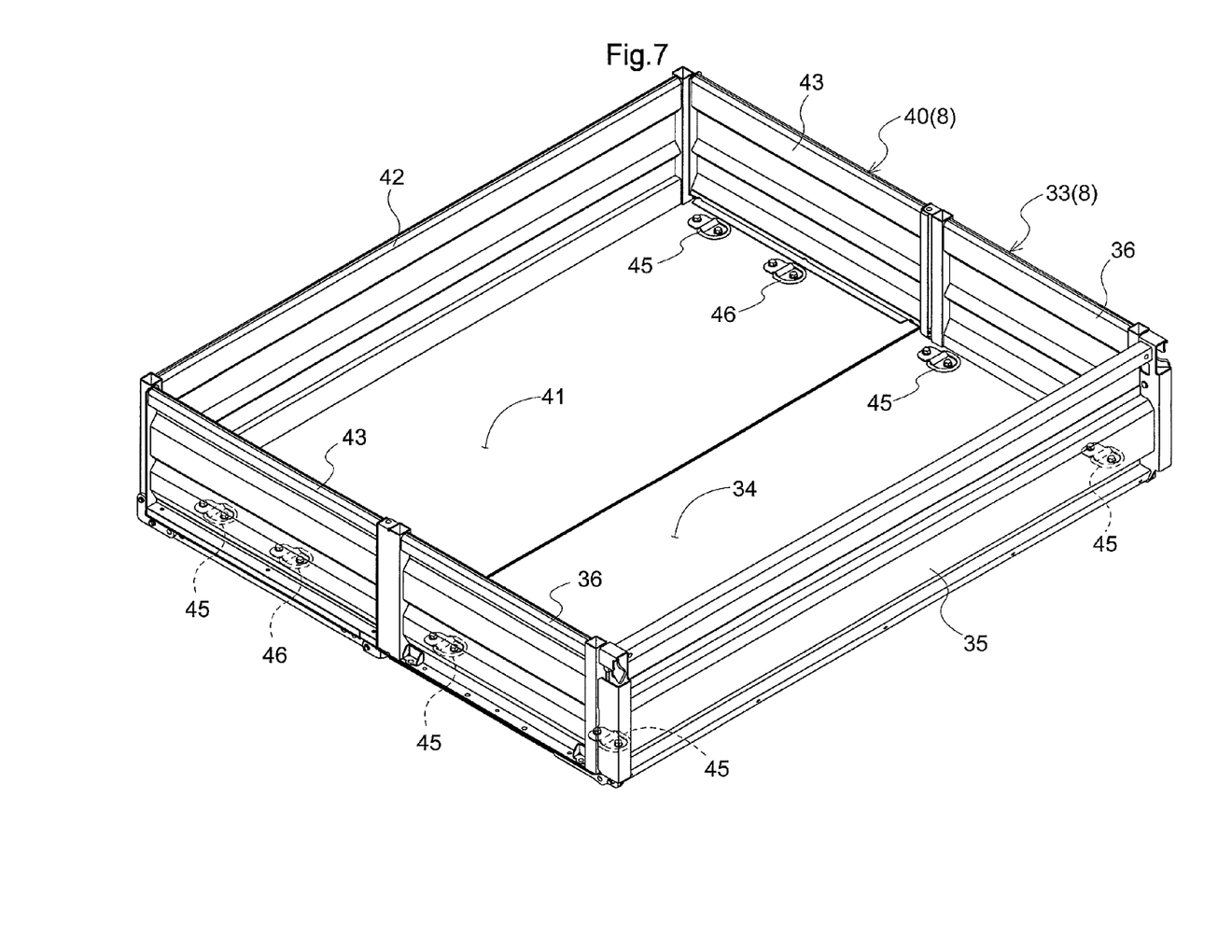
FIG. 7 is a perspective view of the loading platform in the second position.

As shown in FIGS. 2 and 7, the loading platform 8 includes a loading platform body 33 having a bottom plate 34 with the back surface to which the lift cylinder 31 is connected, an extending loading unit 40 having an extending bottom plate 41 connected to a front end of the bottom plate 34 at a rear end thereof.

In addition to the bottom plate 34, the loading platform body 33 includes a rear plate 35 connected to a rear end of the bottom plate 34, and side plates 36 connected to opposite lateral ends of the bottom plate 34.

Figure 6:
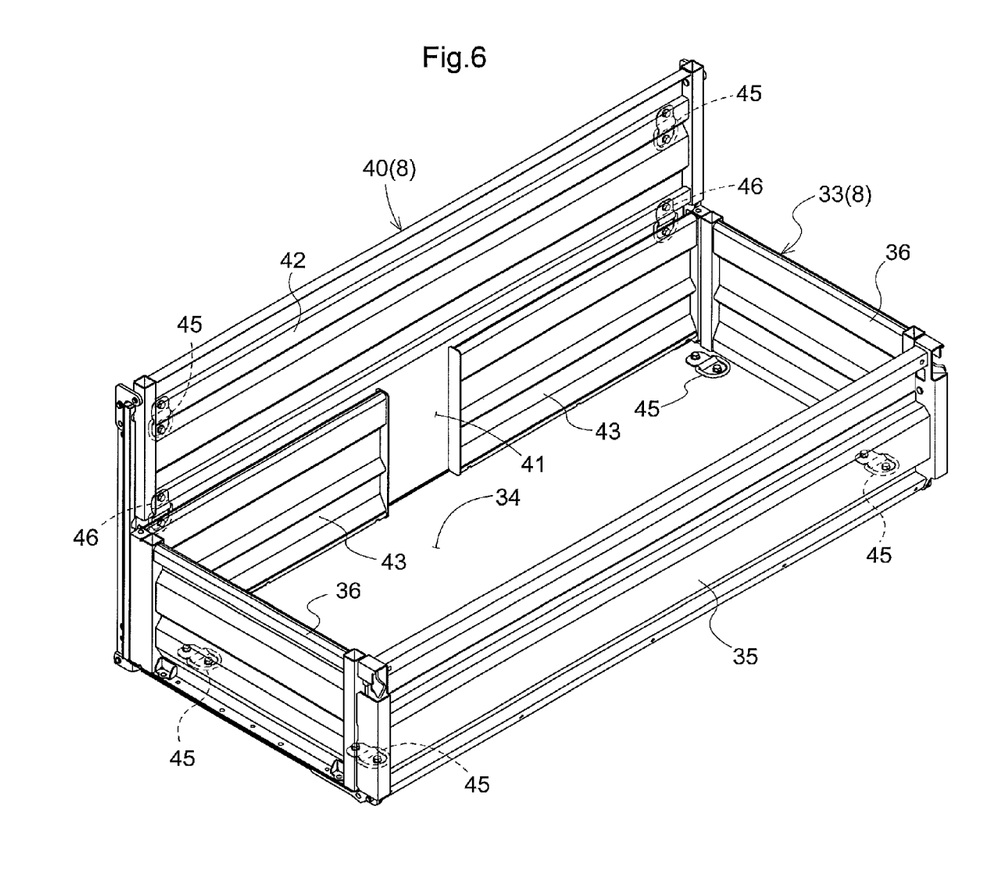
FIG. 6 is a perspective view of the loading platform in the first position.
Figure 8:
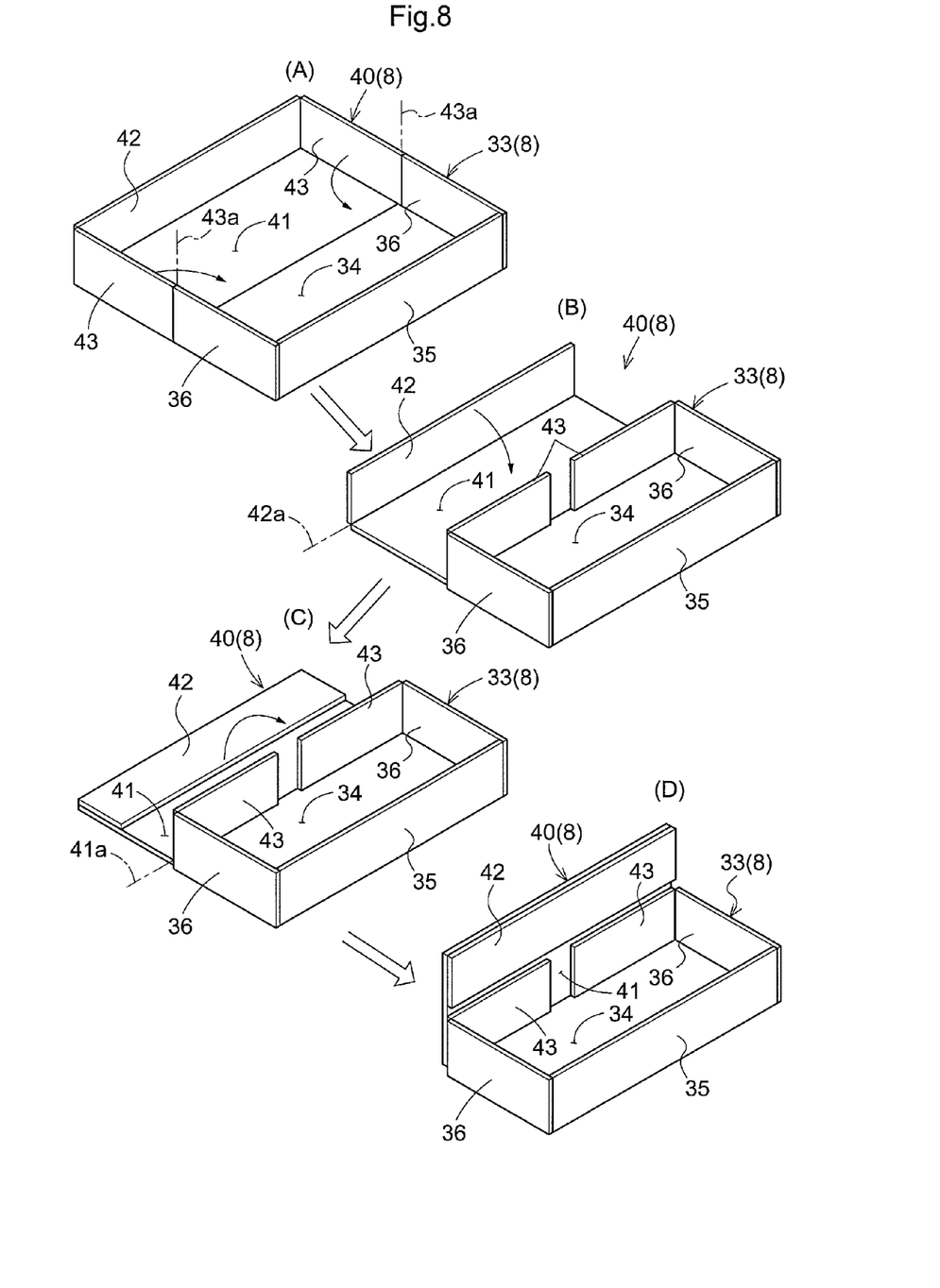
FIG. 8 is an illustration showing a process of switching the loading platform.

In addition to the extending bottom plate 41, the extending loading unit 40 includes a front plate 42 connected to a front end of the extending bottom plate 41 to be pivotable about an axis 42a (see FIG. 8(B)), and extending side plates 43 connected to front ends of the right and left side plates 36 of the loading platform body 33 to be pivotable about axes 43a (see FIG. 8(A)) in the transverse direction of the loading platform. The extending bottom plate 41 is pivotable about an axis 41a (see FIG. 8(C)) relative to the bottom plate 34 of the loading platform body 33, thereby to switch the extending loading unit 40 between a folded position shown in FIGS. 1 and 6 and a stretched position shown in FIGS. 2 and 7.

FIG. 8 is an illustration showing a switching process of the loading platform 8. The extending loading unit 40 shown in FIG. 8(A) is in the stretched position, and the extending loading unit 40 shown in FIG. 8(D) is in the folded position. As shown in FIG. 8(B), the right and left extending side plates 43 are pivoted inward to the folded position to extend along the front edge of the bottom plate 34. Next, as shown in FIG. 8(C), the front plate 42 is pivoted toward the top surface of the extending bottom plate 41 to lie over the top surface of the extending bottom plate 41. Subsequently, as shown in FIG. 8(D), the extending bottom plate 41 is pivoted toward the folded extending side plates 43 to lie over outer surfaces of the extending side plates 43, thereby to switch the extending loading unit 40 to the folded position.

As the extending loading unit 40 is switched to the folded position, the loading platform 8 is switched to a first position in which the longitudinal dimension of the extending loading unit 40 is reduced. In the folded position of the extending loading unit 40, the right and left side plates 43 is positioned inward of the extending bottom plate 41. Thus, compared with a folded position in which the right and left side plates 43 is positioned outward of the extending bottom plate 41, the longitudinal dimension of the loading platform 8 in the first position can be reduced because it is determined by a thickness of the extending side plates 43.

Referring to FIGS. 1 and 3, when the loading platform 8 is shifted to the first position, the front end thereof is positioned rearward of the rear boarding space 14a due to the reduction of the longitudinal dimension, which allows the utility vehicle to provide the two-row seat arrangement.

As shown in FIG. 8(C), the extending bottom plate 41 is pivoted forward to fall down to the stretched position to be flush or substantially flush with the bottom plate 34. Next, as shown in FIG. 8(B), the front plate 42 is pivoted to stand up to the stretched position to rise from the front end of the extending bottom plate 41. Then, as shown in FIG. 8(A), the right and left extending side plates 43 are pivoted outward of the loading platform to the stretched position to be flush or substantially flush with the side plates 36, which allows the extending loading unit 40 to be shifted to the stretched position.

As the extending loading unit 40 is switched to the stretched position, the loading platform 8 is switched to the second position in which the longitudinal dimension of the extending loading unit 40 is increased.

Referring to FIG. 2, when the loading platform 8 is shifted to the second position, the front end thereof enters the rear boarding space 14a due to the increase of the longitudinal dimension. In this situation, the rear seat unit 19 is switched to the storing position, and the partition 15 is moved to the front partitioning position for the single-row seat arrangement, thereby to allow the front end of the loading platform 8 to enter the rear boarding space 14a. The front end of the loading platform 8 enters a free space created by moving the rear seat unit 19 to the storing position (space in which the rear seat unit 19 in the use position is present).

Referring to FIG. 7, eight rope hooks 45 and 46 are provided inside of the loading platform 8. The eight rope hooks 45 and 46 are distributed in two longitudinal positions in the lateral opposite ends of the bottom plate 34 and two longitudinal positions in the lateral opposite ends of the extending bottom plate 41. One of the two hooks 46 provided in each of the lateral opposite ends of the extending bottom plate 41 that is closer to the bottom plate 34 is positioned in a gap between the front plate 42 and one of the extending side plates 43 when the loading platform 8 is shifted to the first position.

Next, the ROPS 6 will be described hereinafter.

Referring to FIGS. 1, 3 and 5, the ROPS includes, in addition to the upper frame 50 extending in the fore-and-aft direction of the vehicle body above the front boarding space 13a and rear boarding space 14a, a pair of right and left front posts 51 extending downward of the vehicle body and distributed in the lateral opposite sides of the vehicle body at the front end of the front boarding space 13a, and a pair of right and left rear posts 52 extending downward of the vehicle body and distributed in the lateral opposite sides of the vehicle body between the front boarding space 13a and the rear boarding space 14a. The front posts 51 and the rear posts 52 are arranged not to overlap the loading platform 8 in both of the first position and the second position as viewed from the side.

The front posts 51 and the rear posts 52 will be described hereinafter.

The pair of right and left front posts 51 have upper ends connected to lateral opposite ends of the front end of the upper frame 50, respectively, and lower ends connected to upper ends of a pair of right and left front support frames 1F mounted on the vehicle frame 1 and extending downward of the vehicle body, respectively. The pair of right and left front posts 51 support the front end of the upper frame 50, and the front end of the ROPS 6 is supported to the vehicle frame 1.

The pair of right and left rear posts 52 have upper ends connected to lateral opposite ends of an intermediate portion of the upper frame 50, respectively, and lower ends connected to upper ends of a pair of right and left rear support frames 1R mounted on the vehicle frame 1 and extending upward of the vehicle body, respectively. The pair of right and left rear posts 52 support the intermediate portion of the upper frame 50, and the rear end of the ROPS 6 is supported to the vehicle frame 1.

Each of the right and left front support frames 1F and each of the right and left rear support frames 1R are formed of a single bent frame element with the front and rear sides extending downward of the vehicle body and with the intermediate portion extending in the fore-and-aft direction of the vehicle body.

Referring to FIG. 2, the right and left rear posts 52 are positioned forward of the front end of the loading platform 8 in the second position. Referring to FIG. 1, the right and left rear posts 52 are positioned forward of the rear seat unit 19 to provide easy access to the space between the rear seat unit 19 and the rear posts 52.

Referring to FIGS. 1 to 5, s reinforcement beam 53 is connected between the lower end of each of the right and left rear posts 52 and a portion of the upper frame 50 positioned rearward of the connecting portion to the corresponding rear post 52. The right and left reinforcement beams 53 have lower ends connected to each other through a cross connecting beam 54.

The upper frame 50 will be described hereinafter.

Referring to FIGS. 3 and 5, the upper frame 50 includes a pair of right and left main beams 60 extending in the fore-and-aft direction, a front cross beam 61 connected to front ends of the right and left main beams 60, a rear cross beam 62 connected to rear ends of the right and left main beams 60, and a center cross beam 63 connected to longitudinal intermediate portions of the right and left main beams 60.

A portion close to the left end of the center cross beam 63 is connected to a forward end portion of the left main beam 60 through a left connecting frame 64 extending diagonally. A portion close to the right end of the center cross beam 63 is connected to a forward end portion of the right main beam 60 through a right connecting frame 65 extending diagonally. The center cross beam 63 and the rear cross beam 62 are connected to each other at their intermediate portions through a rear center cross beam 66 extending in the fore-and-aft direction.

Each of the right and left main beams 60 includes a beam section 60F positioned forward of the connecting portion to the corresponding rear post (front beam section), a beam section 60R positioned rearward of the connecting portion to the corresponding rear post (rear beam section), and a connecting element 67 for connecting the front beam section to the rear beam section.

In each of the right and left sides of the ROPS 6, the front post 51, the rear post 52 and the front beam section 60F of the main beam 60 are formed of a single bent frame element with the front end thereof representing the front post 51, the rear end thereof representing the rear post 52, and the intermediate portion thereof representing the front beam section 60F. The right and left rear beam sections 60R of the main beam 60 and the rear cross beam 62 are formed of a single bent frame element with the lateral opposite sides thereof representing the rear beam sections 60R of the main beam 60, and the intermediate portion thereof representing the rear cross beam 62.

Alternative Embodiments

Figure 9:
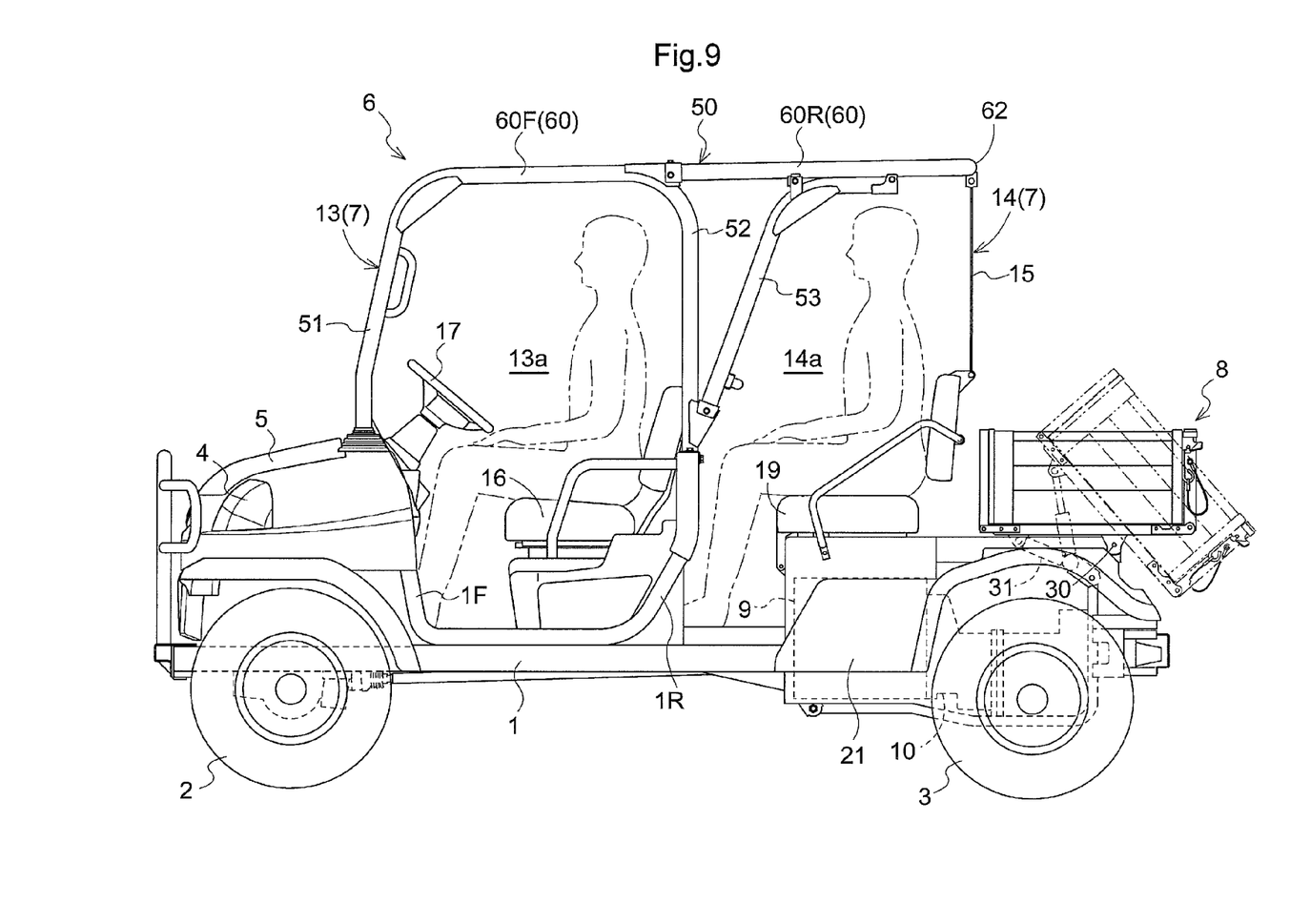
FIG. 9 is an overall side view of the utility vehicle according to a first alternative embodiment.

FIG. 9 is an overall side view of the utility vehicle provided with a construction according to a first alternative embodiment. This type of utility vehicle includes the boarding section 7 having the front boarding section 13 and the rear boarding section 14, but does not include any function to switch the loading platform 8 to the second position, which provides only the two-rows seat arrangement. The ROPS 6 of this type of utility vehicle has the same construction as the ROPS 6 shown in FIGS. 1, 3 and 5.

Figure 10:
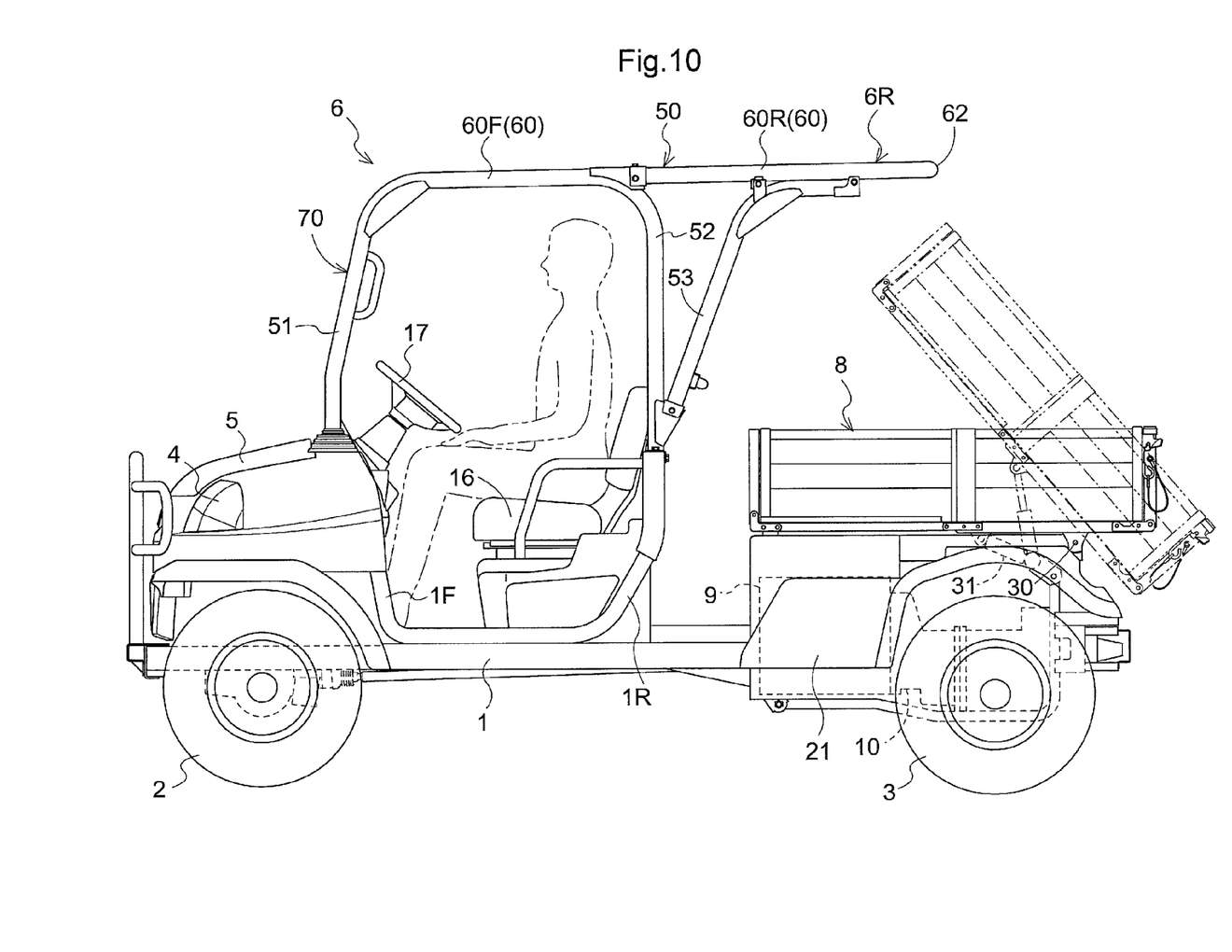
FIG. 10 is an overall side view of the utility vehicle according to a second alternative embodiment.

FIG. 10 is an overall side view of the utility vehicle provided with a construction according to a second alternative embodiment. This type of utility vehicle includes a driver's boarding section 70 corresponding to the front boarding section 13 without the rear boarding section, which provides only the single-row seat arrangement. The ROPS 6 of this type of utility vehicle has the same construction as the ROPS 6 shown in FIGS. 1, 3 and 5. The front end of the loading platform 8 enters a space defined under a section 6R of the ROPS 6 positioned rearward of the rear posts 52.

In this type of utility vehicle, when the structure 6R of the ROPS 6 positioned rearward of the rear posts 52, that is, the structure including the right and left rear beam sections 60R of the main frame 60 and the rear cross beam 62 is detachable from the vehicle body, open space can be advantageously secured above the loading platform 8. Further, the structure 6R of the upper frame 50 positioned rearward of the rear posts 52 may be folded forward.

In the first embodiment, the foldable type of extending loading unit 40 is employed to switch the loading platform 8 between the first position and the second position. Instead, it is possible to employ an extending loading unit supported to slide relative to the loading platform body 33 in the fore-and-aft direction so that a length projecting forward from the loading platform body 33 is adjustable.

In the first embodiment, the loading platform 8 is switchable between the first position and the second position by varying the longitudinal dimension of the loading platform. Instead of varying the longitudinal dimension of the loading platform, the entire loading platform 8 may be slidable relative to the vehicle body in the fore-and-aft direction, thereby to switch the loading platform 8 between the first position and the second position.

In the first embodiment, the rear seat unit 19 is switched to the storing position to allow the front end of the loading platform 8 to enter the vacant seating space. Instead, the front end of the loading platform 8 may enter the rear boarding space 14a with the rear seat unit 19 being in the use position.

In the first embodiment, the partition 15 is moved in the fore-and-aft direction by switching the rear seat unit 19 between the use position and the storing position. Instead, the operation for switching the rear seat unit 19 between the use position and the storing position may be performed separately from the operation for moving the partition 15 in the fore-and-aft direction.

In the first embodiment, the rear posts 52 are positioned forward of the rear seat unit 19. When the front end of the loading platform 8 enters the rear boarding space 14a with the rear seat unit 19 being in the use position, the rear posts 52 may be positioned in the lateral sides of the rear seat unit 19, overlapping the rear seat unit 19 as viewed from the side.

While the reinforcement beams 53 are provided in the first embodiment, they are dispensable.

In addition to the utility vehicle having the front boarding section 13 and the rear boarding section 14 each accommodating two persons, the present invention may be applied to a utility vehicle having the front boarding section 13 and the rear boarding section 14 each accommodating less than or more than two persons, or a utility vehicle accommodating the different number of persons between the front boarding section 13 and the rear boarding section 14.

What is claimed is:

1. A utility vehicle comprising:
   a vehicle frame extending in a fore-and-aft direction of a vehicle body;
   a front boarding section mounted forward of the vehicle body;
   a rear boarding section mounted rearward of the front boarding section and including a rear seat unit;
   a roll over protection structure (ROPS) delimiting space including a front boarding space acting as a ride-in space of the front boarding section and a rear boarding space acting as a ride-in space of the rear boarding section, the ROPS including a plurality of posts supported to the vehicle frame and an upper frame supported to the posts and delimiting upper space of the front boarding space and the rear boarding space; and
   a platform system with a loading platform mounted rearward of the vehicle body to be switchable between a first position in which a front end of the loading platform is positioned rearward of the rear boarding space and a second position in which the front end of the loading platform enters the rear boarding space;
   wherein all of the posts of the ROPS are arranged so as not to overlap the loading platform in both of the first position and the second position as viewed from a lateral side of the vehicle body.

2. The utility vehicle according to claim 1, wherein the posts of the ROPS include a pair of right and left front posts and a pair of right and left rear posts, each of the front posts and the rear posts being spaced from each other in a transverse direction of the vehicle body, and the rear posts are positioned forward of the front end of the loading platform in the second position between the front boarding space and the rear boarding space in the fore-and-aft direction.

3. The utility vehicle according to claim 2, wherein the rear posts are positioned forward of the rear seat unit.

4. The utility vehicle according to claim 2, wherein the rear posts are connected to the upper frame at intermediate portions of the upper frame in the fore-and-aft direction of the vehicle body.

5. The utility vehicle according to claim 1, wherein the rear seat unit has a foldable structure to allow the rear seat unit to be switched between a use position in which the rear seat unit is developed in a rear region of the rear boarding space and a storing position in which the rear seat unit is folded in a front region of the rear boarding space, and the front end of the loading platform in the second position enters the open rear region of the rear boarding space created by shifting the rear seat unit to the storing position.

6. The utility vehicle according to claim 1, wherein the upper frame includes a front upper frame section delimiting upper space of the front boarding space and a rear upper frame section delimiting upper space of the rear boarding space, the rear upper frame section being detachable.

7. A utility vehicle comprising:
   a vehicle frame extending in a fore-and-aft direction of a vehicle body;
   a front boarding section mounted forward of the vehicle body;
   a rear boarding section mounted rearward of the front boarding section and including a rear seat unit;
   a roll over protection structure (ROPS) delimiting space including a front boarding space acting as a ride-in space of the front boarding section and a rear boarding space acting as a ride-in space of the rear boarding section, the ROPS including a plurality of posts supported to the vehicle frame and an upper frame supported to the posts and delimiting upper space of the front boarding space and the rear boarding space; and
   a platform system with a loading platform mounted rearward of the vehicle body to be switchable between a first position in which a front end of the loading platform is positioned rearward of the rear boarding space and a second position in which the front end of the loading platform enters the rear boarding space;
   wherein the posts of the ROPS are arranged so as not to overlap the loading platform in both of the first position and the second position as viewed from a lateral side of the vehicle body;
   wherein the posts of the ROPS include a pair of right and left front posts and a pair of right and left rear posts, each of the front posts and the rear posts being spaced from each other in a transverse direction of the vehicle body, and the rear posts are positioned forward of the front end of the loading platform in the second position between the front boarding space and the rear boarding space in the fore-and-aft direction; and
   wherein the utility vehicle further comprises a pair of right and left reinforcement beams extending diagonally for connecting the rear posts to the upper frame at portions rearward of connecting points to the rear posts.

* * * * *